United States Patent [19]

Vigneron

[11] Patent Number: 4,741,560
[45] Date of Patent: May 3, 1988

[54] SEAL ASSEMBLY FOR CONNECTING TWO PIPE SECTIONS

[75] Inventor: Pierre Vigneron, Maidieres, France

[73] Assignee: Pont-A-Mousson S.A., Nancy, France

[21] Appl. No.: 502

[22] Filed: Jan. 5, 1987

[30] Foreign Application Priority Data

Jan. 3, 1986 [FR] France .............................. 86 00059

[51] Int. Cl.$^4$ ............................................ F16L 55/00
[52] U.S. Cl. ..................................... 285/91; 285/321; 285/348; 285/910
[58] Field of Search ................. 285/321, 348, 374, 91, 285/230, 231, 910

[56] References Cited

U.S. PATENT DOCUMENTS

| | | |
|---|---|---|
| 2,543,185 | 2/1951 | Mathiew .......................... 285/348 X |
| 2,877,732 | 3/1959 | Eaton .............................. 285/321 X |
| 3,733,093 | 5/1973 | Seiler ................................... 285/348 |
| 3,765,706 | 10/1983 | Bram . |
| 4,183,560 | 1/1980 | Wyss .............................. 285/374 X |
| 4,428,604 | 1/1984 | Conner ................................ 285/321 |

Primary Examiner—Dave W. Arola
Attorney, Agent, or Firm—Sughrue, Mion, Zinn, Macpeak, and Seas

[57] ABSTRACT

A seal assembly for axially connecting a male or spigot end 1 of a pipe T1 within a female or socket end 2 of a pipe T2 includes a radially compressed gasket G set between the outer surface of the spigot end and the inner surface of the socket, and a metal ring 3 which fits around the spigot end and bears against a lateral, inwardly facing surface 27 of an internal split metal mating flange 4, which in turn abuts internal surfaces 26, 24 on the inturned lip at the mouth of the socket. The gasket abuts the inner surface 20 of the metal ring.

8 Claims, 3 Drawing Sheets

SEAL ASSEMBLY FOR CONNECTING TWO PIPE SECTIONS

BACKGROUND OF THE INVENTION

This invention relates to a seal assembly for connecting two pieces of a pipeline or conduit, one of which has a plain end and the other a socket end. More specifically, the invention concerns a seal for connecting a large-diameter pipe (D>800 mm) having spigot and socket ends, to other pieces such as an elbow with two sockets, a T-pipe with two sockets, or even a connecting sleeve with two sockets.

French Pat. No. 2,094,278 discloses a seal for joining two pieces of a pipeline or conduit, one having a plain end and the other a socket end, formed by inserting a gasket that is compressed radially between the inner surface of the socket and the outer surface of the plain end.

In this type of seal, the gasket is placed between the spigot end and the socket only after the spigot end has been inserted within the socket. This makes it possible to set the spigot into the socket without a great deal of effort.

After the gasket has been set into place, the insertion of means for closing off the socket, which may consist of a ring nut or a bayonet ring or even a mating flange fastened to the outer surface of the socket, prevents the gasket from being pushed out of the socket when the pipeline or conduit is pressurized.

In this type of seal the gasket, in its free state, has an inner diameter that is close to the outer diameter of the spigot end onto which it is to be placed. Once slipped over the spigot end, but before being compressed by the socket, it exerts no force. It is thus necessary in setting the gasket between the spigot and socket to employ a level of force that may be quite high, if not totally prohibitive, and that in any event will require the use of complicated and heavy equipment.

Furthermore, once the gasket is set, either the inner surface of the socket must be threaded, or a mating flange with numerous bolts must be installed. In either case, the field installation of such a seal becomes very difficult if not impossible, given the size of the pieces being handled (in the case of pipelines or conduits with a diameter greater than 800 mm) and the gripping force involved.

SUMMARY OF THE INVENTION

The purpose of the instant invention is to solve these installation problems. Its object is to provide a seal assembly for connecting two sections of axial pipeline together, one section having a spigot end and the other section having an end socket. The seal assembly comprises, in succession from an inner end of the socket, a radially compressed gasket set between the outer surface of the spigot end and the inner surface of the socket, a metal ring which fits around the spigot end and rests against a lateral or end surface of the gasket, and an internal split metal mating flange which abuts the ring at one end and an inturned lip of the socket at the other end.

DETAILED DESCRIPTION OF THE PREFERRED EMBODIMENT

Figure 1:
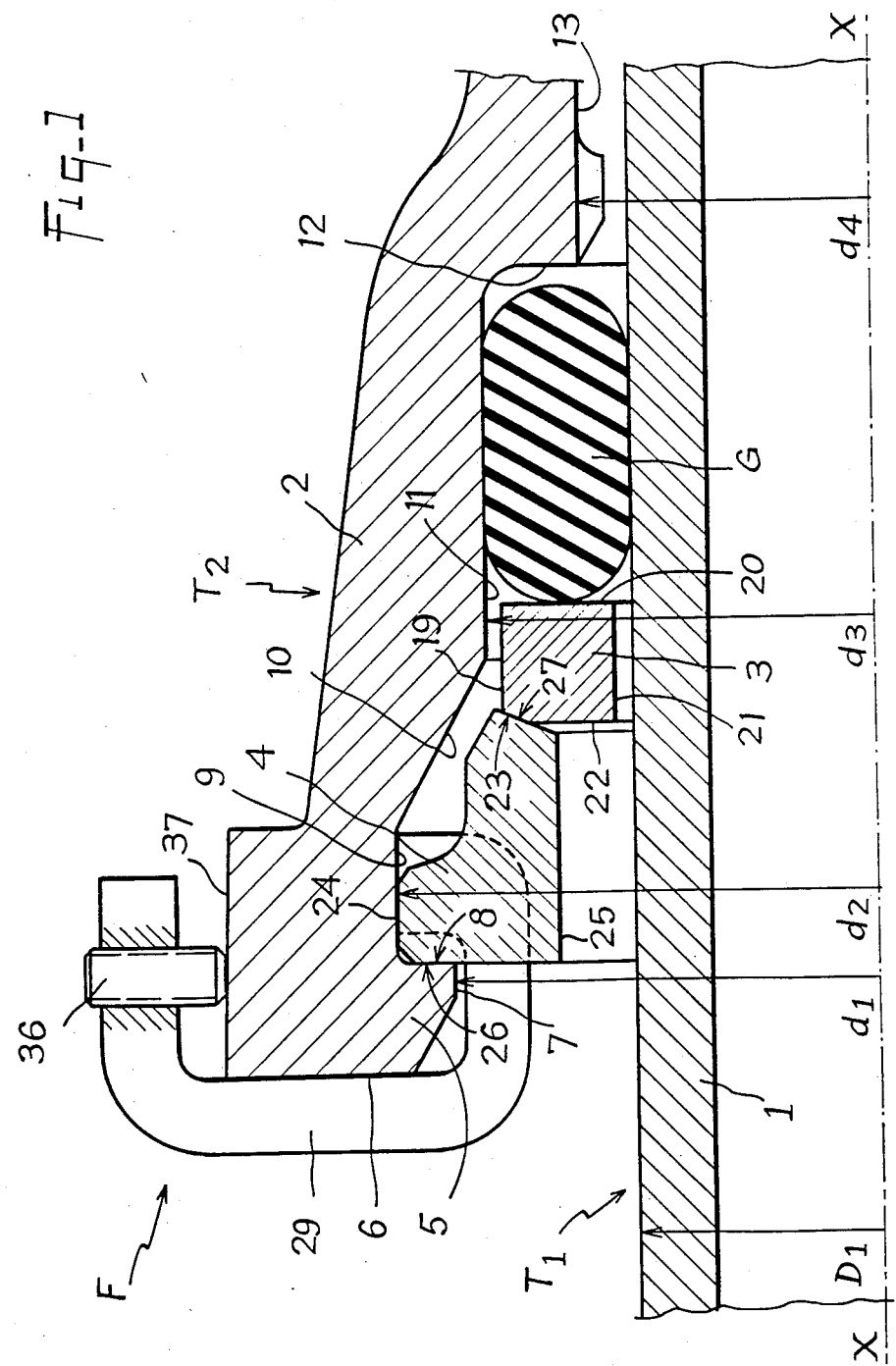
FIG. 1 is a cross-sectional view of the seal of the invention.

In the embodiment shown in FIG. 1, the seal comprises a spigot end 1 of a tubular pipe T1 having axis X—X and diameter D1, a socket 2 of a second tubular pipe T2 having axis X—X, an interposed gasket G, and a ring 3 and a mating flange 4 that are housed within the socket to prevent the expulsion of the gasket.

The open end of the socket 2 has a collar 5 defining a flat end surface 6 perpendicular to axis X—X, an inner cylindrical surface 7 joining surface 6 and having a diameter d1, and a flat surface 8 perpendicular to axis X—X, lying inside the socket, and which joins surface 7. The collar 5 extends inwardly toward the base of the socket in the form of a cylindrical surface 9 with axis X—X and diameter $d2>d1$, a conical surface 10, having axis X—X and converging toward the base of the socket, and a cylindrical surface 11 having axis X—X and diameter $d3<d1<d2$ which is delimited at the end nearest the socket base by a surface 12 adjoining another cylindrical surface 13 of diameter $d4<d1$.

Figure 2:
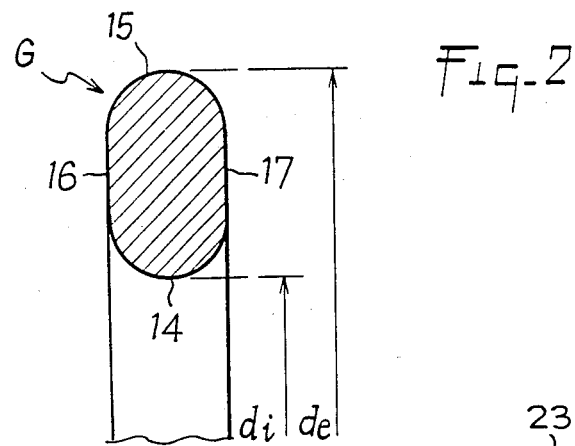
FIG. 2 is a radial cross-section of the gasket portion of the seal.

The cross-section of gasket G in its free state may be circular, in which case it would be a simple toroid. In another embodiment, the cross-section of the gasket may consist of inner and outer convex annular surfaces 14, 15 connected by two parallel flat surfaces 16 and 17 perpendicular to axis X—X of the seal, as shown in FIG. 2.

According to one advantageous characteristic of the invention, inner surface 14 of gasket G has a minimum inner diameter di that is less than the outer diameter D1 of the spigot end 1. In addition, outer surface 15 of the gasket has a maximum diameter de that is greater than the diameter d3 of surface 11 of socket 2.

In practice, diameter di of gasket surface 14 is such that, once the gasket is placed around the outer surface of spigot end 1, it exhibits an elongation of 2 percent for the minimum value of diameter D1 of spigot end 1. The outer diameter of spigot end 1 may vary, given manufacturing tolerances at the foundry, between a maximum value Dmax and a minimum value Dmin. Thus, for the minimum diameter Dmin of spigot end 1, the relaxed diameter of gasket G is 0.98 Dmin.

Figure 3:
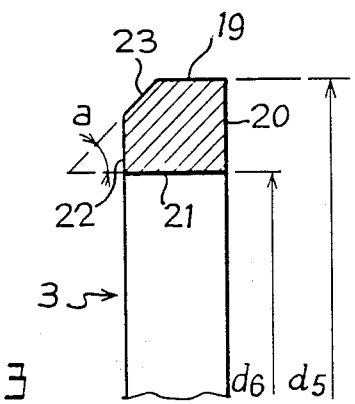
FIG. 3 is a radial cross-section of the metal ring of the seal.

As shown in FIGS. 1 and 3, the overall cross section of ring 3 (which, in practice, is made from cast iron) is generally rectangular or square. The ring 3 thus has an outer cylindrical surface 19 with axis X—X and diameter $d5<d3$ of surface 11 of socket 2. Surface 19 is parallel to an inner cylindrical surface 21 having axis X—X and diameter d6 greater than the maximum diameter of pipe end 1. Surfaces 19 and 21 are adjoined by flat planar surfaces 20 and 22 which face, respectively, surface 12 of the base of socket 2 and collar 5 at the opening of the socket. Surfaces 22 and 19 of the ring 3 are connected by a conical surface 23, which diverges in the direction of the socket base, forming an angle a of approximately 70° with axis X—X.

Ring 3 may be a closed ring, or an open ring that is closed subsequently with a plastic or metal insert (not shown).

Figure 4:
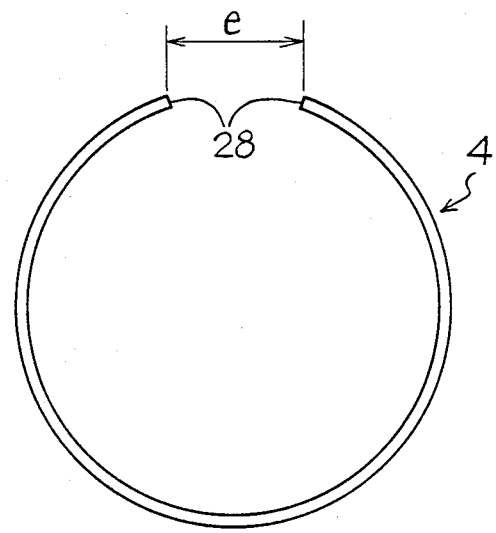
FIG. 4 is an end view of the internal mating flange of the seal.
Figure 5:
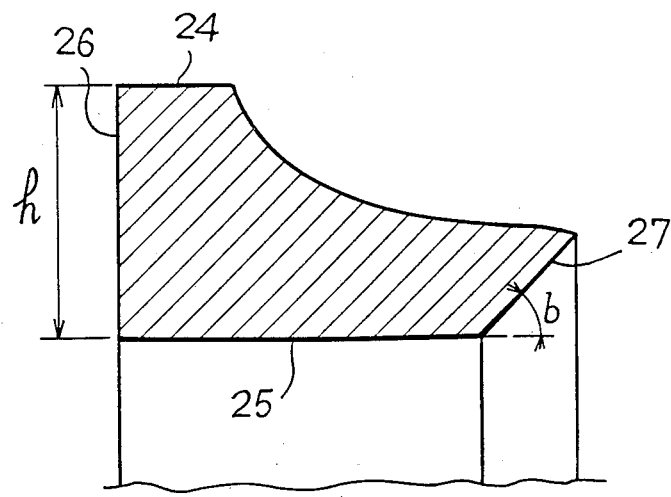
FIG. 5 is a radial cross-section of the mating flange.

Lastly, as shown in FIGS. 4 and 5, mating flange 4 consists of an incomplete, open ring comprising a cylindrical outer surface 24 with axis X—X and a diameter corresponding to diameter d2 of surface 9 of socket 2. Flange 4 further has an inner cylindrical surface 25 with a diameter less than the outer diameter d5 of surface 19 of ring 3. Surfaces 24 and 25 of the flange are connected, on the side facing the socket opening, by a flat surface 26 designed to engage surface 8 of the socket collar 5. On the side facing the base of the socket, surface 25 extends into a conical surface 27 that diverges in the direction of the socket base, forming an angle b with axis X—X which corresponds to angle a of surface 23 of ring 3, and which in practice is thus approximately 70°.

As shown in FIG. 4, the internal mating flange 4 consists of an incomplete, open ring having two radial end surfaces 28. The flange is sufficiently elastic to allow it to vary in diameter. In addition, the height h of surface 26 is less than the width of the opening formed by the outer surface of spigot end 1 and the inner surface 7 of collar 5 when the socket has a minimum internal diameter and the spigot end has a maximum internal diameter. The gap e between the two end surfaces 28 of the flange 4 is wide enough so that when the two surfaces 28 are in contact the outer diameter of the flange, formed by outer surface 24, will be less than diameter d1 of socket surface 7.

Figure 6:
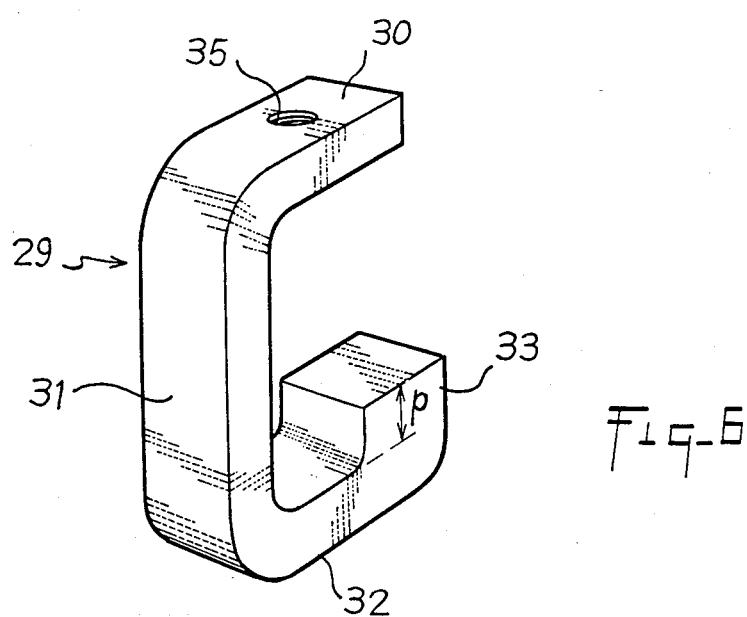
FIG. 6 is a perspective view of one of the two pieces used to block the mating flange.

Lastly, spreading means F to part the radial end surfaces 28 of flange 4, are provided to ensure perfect contact between outer flange surface 24 and inner socket surface 9. As shown in FIG. 6, the means for spreading and stabilizing end surfaces 28 consist of two identical G-shaped pieces 29 that grip the socket collar 5. The two pieces 29 each have an upper leg 30 roughly parallel to axis X—X, a vertical portion 31 perpendicular to axis X—X and abutting surface 6 of the socket, and a lower leg 32 roughly parallel to axis X—X and longer than the axial length of socket surface 7. The lower leg 32 extends upwardly at its end facing the socket base in the form of a vertical post 33 of height p greater than the height q of collar surface 8. A vertical threaded hole 35 is provided in the upper leg 30 of each piece 29 to accommodate a screw 36 that will be tightened against surface 37 of the socket end.

Assembly

After slipping flange 4, ring 3, and gasket G successively over the outer surface of the spigot end 1 of pipe T1, the bare spigot end is introduced into the socket without allowing the gasket, the ring, and the flange to enter.

Next, using a simple device not shown, gasket G (already elongated by at least 2 percent) is set into the seat formed by the outer surface of the spigot end, surface 12 of the socket base, and surface 11 of the socket.

The metal ring 3 is then pushed into the base of the socket, with surface 20 of the ring contacting surface 16 of the gasket. If the ring 3 is a split ring, a part designed to close the ring is set into place to form a complete, closed ring.

Finally, mating flange 4 is contracted about the outer surface of spigot end 1 using means not shown, and introduced into the socket through the opening formed by collar surface 7 and the outer surface of the spigot end. The means for contracting the flange may consist of a simple cable or sleeve tightened around its outer surface.

Once flange surface 26 has passed collar surface 8, moving axially, the flange contraction is released. By virtue of the natural elasticity of the flange, surfaces 24 and 26 thereof move into contact with the inner surfaces 9 and 8 of the socket.

Lastly, in order to hold the flange 4 tightly and permanently in position, two locking pieces 29 are set into place, with part 31 of each piece making contact with end surface 6 of the socket collar. The two locking pieces individually engage the radial end surfaces 28 of the flange, and they are spread apart by a tool (not shown) to radially or circumferentially expand the flange such that its outer radial surface 24 is pressed tightly against the inner surface 9 of the socket. To prevent the flange from contracting the locking pieces 29 are held in position by screws 36 that are tightened onto surface 37 of the socket. Each screw 36 and each post 33 of the locking pieces thus serve as a jaw that clamps onto the end portion of the socket formed by surfaces 37, 6, 7, and 8.

Once locking pieces 29 are made fast by screws 36 and by contact with socket surface 9, the flange 4, whose surface 24 is in contact with socket surface 9, can no longer recontract. The installation of the seal assembly is then complete.

Operation

When the pipeline or conduit is put to use, the pressurized fluid circulating within it tends to push gasket G out of its seat and toward the end of the socket 2. The gasket then pushes against metal ring 3, whose conical surface 23 contacts the corresponding conical surface 27 of the flange 4. Once this contact is made, gasket G can move no further toward the socket end formed by collar 5.

Advantages

The seal assembly of the invention simplifies the formation of a seal for large-diameter pipes. Forming the seal on the job site is simple and does not require the use of flanges bolted to the socket mouth. The seal further prevents the expulsion of the gasket from the socket.

What is claimed is:

1. A seal assembly for connecting one section of a pipeline or conduit (T1) having an axis X—X and a spigot end (1), to a second section (T2) having an axis X—X and an end socket (2), said seal assembly comprising: in succession within a space defined between an outer surface of the spigot end and inner surfaces of the socket, and in a direction from an innermost base end (12) of said space towards a mouth thereof, a radially compressed gasket (G) sealingly disposed between an outer surface of the spigot end and an inner surface (11) of the socket, wherein the gasket has an internal diameter (di) equal to 0.98 Dmin, with Dmin being the minimum outer diameter of the spigot end, a metal ring (3) disposed around the spigot end and having an inner axial surface (20) abutting the gasket, and an internal split metal mating flange (4) having outer axial and outer radial surfaces (26, 24) abutting first and second internal surfaces (8, 9) on a radially inturned lip of the socket, and an inner axial surface (27) abutting an outer axial surface (23) of the ring.

2. The seal according to claim 1, wherein the outer axial surface of the metal ring has a conical face (23)

that diverges in the direction of the base end of the socket, forming an angle a with axis X—X.

3. The seal according to claim 2, wherein the inner axial surface of the internal mating flange (4) has a conical face (27) that diverges in the direction of the base end of the socket (2), forming an angle b with axis X—X equal to angle a.

4. The seal according to claim 3, wherein the angles a and b are 70°.

5. The seal according to claim 1, wherein the gasket is radially elongated by at least 2 percent upon insertion over the spigot end.

6. The seal according to claim 1, further comprising means (F) for spreading radial end surfaces (28) of the split flange (4) to urge the outer radial surface (24) thereof against an inner surface (9) of the socket.

7. The seal according to claim 6, wherein said spreading means (F) comprises at least one G-shaped piece (29) having an upper leg (30) substantially parallel to axis X—X, a vertical portion (31) perpendicular to axis X—X, a lower leg (32) substantially parallel to axis X—X and longer than the axial length of said third internal surface, and a vertical post (33) having a height greater than the height of said first internal surface, said at least one G-shaped piece clamping said flange against said second internal surface.

8. The seal according to claim 1, wherein said second internal surface (9) is a distance $d_2$ from said axis X—X, said flange having a third internal surface (7) which is a distance $d_1 < d_2$ from said axis X—X, said first internal surface (8) being perpendicular to and adjoining both said first and third internal surfaces to define said radially inturned lip.

* * * * *